US012737320B2

(12) United States Patent
Pillarick, III et al.

(10) Patent No.: US 12,737,320 B2
(45) Date of Patent: Sep. 15, 2026

(54) METHOD OF GENERATING AT-SCALE GEOSPATIAL FEATURES OF DESIGNATED ATTRIBUTION AND GEOMETRY

(71) Applicant: The United States of America as Represented by the Director of the National Geospatial-Intelligence Agency, Springfield, VA (US)

(72) Inventors: Mitchell Pillarick, III, Bethalto, IL (US); Christen Welch, Byrnes Mill, MO (US); Christopher Black, Kirkwood, MO (US)

(73) Assignee: The United States of America, as Represented by the Director of the National Geospatial-Intelligence Agency, Springfield, VA (US)

( * ) Notice: Subject to any disclaimer, the term of this patent is extended or adjusted under 35 U.S.C. 154(b) by 0 days.

(21) Appl. No.: 16/915,778

(22) Filed: Jun. 29, 2020

(65) Prior Publication Data

US 2020/0409905 A1 Dec. 31, 2020

Related U.S. Application Data

(60) Provisional application No. 62/868,268, filed on Jun. 28, 2019.

(51) Int. Cl.
*G06N 20/00* (2019.01)
*G06F 16/11* (2019.01)

(52) U.S. Cl.
CPC .......... *G06F 16/122* (2019.01); *G06N 20/00* (2019.01)

(58) Field of Classification Search
None
See application file for complete search history.

(56) References Cited

U.S. PATENT DOCUMENTS 7,239,320 B1 * 7/2007 Hall .................... G11B 27/10
8,965,906 B1 * 2/2015 Werth .................... G06F 16/29 707/752

(Continued)

OTHER PUBLICATIONS

"What is Geospatial Data?—Geospatial Data—AWS" Amazon Web Services, https://aws.amazon.com/what-is/geospatial-data downloaded Oct. 17, 2025.

(Continued)

*Primary Examiner* — Yu Zhao
(74) *Attorney, Agent, or Firm* — Mrunalini Mummalaneni

(57) ABSTRACT

A computer-implemented method is disclosed for generating large volumes of data for purposes such as testing data validation tools and training machine-learning models. Selecting a data schema and identifying its rules and conditions establish the characteristics of the data to be generated. The internal data structure can be organized into a multilevel nested hierarchy of bounding boxes that serve as separate containers for articles of data. The bounding boxes can be readily configured in a manner that generates a broad spectrum of data applicable to even the most complex or lengthy data schema, such as creating separate bounding boxes for data that complies with the rules of the schema, and data that fails to comply. By automating data generation in this manner, users can generate desired data at scale, instead of relying on time-intensive manual production efforts, and precisely tailor the generated data for the desired purposes.

23 Claims, 3 Drawing Sheets

(56) References Cited

U.S. PATENT DOCUMENTS

| | | | | |
|---|---|---|---|---|
| 10,558,224 | B1 * | 2/2020 | Lin | G08G 1/165 |
| 2006/0104511 | A1 * | 5/2006 | Guo | G06V 30/416<br>382/176 |
| 2008/0195584 | A1 * | 8/2008 | Nath | G06F 16/951<br>707/999.102 |
| 2008/0301570 | A1 * | 12/2008 | Milstead | G06F 21/335<br>726/14 |
| 2011/0316854 | A1 * | 12/2011 | Vandrovec | G06T 17/205<br>345/420 |
| 2017/0124230 | A1 * | 5/2017 | Liu | G06F 17/16 |
| 2017/0161341 | A1 * | 6/2017 | Hrabovsky | G06F 16/21 |
| 2018/0165364 | A1 * | 6/2018 | Mehta | G06F 9/54 |
| 2019/0028843 | A1 * | 1/2019 | Santarone | G01C 21/367 |
| 2020/0143499 | A1 * | 5/2020 | Erdem | G06N 5/01 |

OTHER PUBLICATIONS

“What is spatial data and how does it work?” Definition from TechTarget, Rahul Awati et al, published Apr. 9, 2024, downloaded Oct. 17, 2025 from https://www.techtarget.com.

* cited by examiner

METHOD OF GENERATING AT-SCALE GEOSPATIAL FEATURES OF DESIGNATED ATTRIBUTION AND GEOMETRY

BACKGROUND

Organizations involved in acquiring, generating, and exploiting data routinely grapple with a lack of data suitable for developing and testing software and applications. In many instances, the data gap is not readily closed by reliance on traditional means. Applications that are ideally tested using datasets possessing thousands, or even millions, of features cannot leverage production methods that might require several minutes of human attention per feature. One prime example is the area of quality assurance and geospatial data integrity. Vectorized geospatial data, i.e. data in vector format, employs a coordinate system to define locations for various map features such as roads, bridges, and buildings. Vectorized data can be viewed in and generated by Geographic Information Systems (GIS) software. Before doing so, geospatial data users are obliged to validate the vectorized geospatial data they work with.

At its most basic, the validation process involves checking spatial relations, attribution, and schema compliance. Some community datasets, such as the Multinational Geospatial Co-Production (MGCP) and Topographic Data Store (TDS), employ geospatial schema to further consistency across attribution, geometric, and symbolic representation of spatial vector data. MGCP is, amongst its other attributes, an international effort to centralize a standard spatial data repository. TDS is a subset of the U.S. National System for Geospatial Intelligence (NSG), focused primarily on topographic features. MGCP's and TDS's schemas may involve anywhere from a few thousand to tens of millions of features. Any tool used to validate such feature-intensive vectorized data should itself be subject to rigorous testing using data having a scope of features comparable to the data targeted for validation. Until the present invention, this was difficult or impossible to achieve.

Other examples of software and applications in need of large data sets for testing and training involve a range of cases. Military decisions are guided by intelligence gathering, which could include developing and training models to identify and accomplish mission objectives. The more these models are tested with large sets of training data possessing the salient features, the more human attention can be devoted to analyzing atypical elements. Government, intergovernment, academic, and commercial applications for modeled data involve many of the same general considerations. Several variables need to be considered in relation to a real-world environment, but real-world data may not be available at a quality or quantity sufficient to thoroughly training such models. The advantages of the present invention can be readily applied to such cases.

BRIEF SUMMARY OF THE INVENTION

The present invention is a computer-implemented method for generating data. The method requires first selecting a schema that broadly describes the attributes and characteristics for the data to be generated. The schema forms the basis for identifying rules and conditions the generated data must evaluate. A set of evaluation protocols derived from the selected schema are then selected. In a geospatial context, for example, a schema might establish criteria for railroad features such as bridges. Evaluation protocols under that schema would accordingly require that railroad bridges coincide with railroad tracks.

The selection of evaluation protocols, together with user input parsed for accuracy and sufficiency, establish the scope and the structural parameters of the generated data. In certain embodiments of the invention, instead of a monolithic structure, the data is organized into a hierarchy of bounding boxes that are each designated to store a different article of generated data. This flexible structure allows for increasingly complex outputs depending on the number of, and the relationships among, the bounding boxes. The bounding box concept can be configured to automatically generate both 'good' data (complies with the rules of the schema) and 'bad' data (violates the rules of the schema). This mix of good and bad data gives the generated data a robust and realistic spectrum of desired features, representing every possible eventuality. When implemented by computer as the invention teaches, data can be generated rapidly at scale, stored, displayed to the user, and employed for a variety of testing and training algorithms and other purposes.

DETAILED DESCRIPTION OF THE INVENTION

The organization and manner of the structure and operations of the invention, together with objects and advantages thereof, may best be understood by reference to the following description, taken in connection with the accompanying drawings, which are discussed with reference to the features numbered therein. The invention may be susceptible to embodiments in different forms. As such the specific embodiments presented should be considered as exemplifications of the principles of the invention, and are not intended to limit the invention as illustrated and described herein.

The invention provides a method in which large amounts of data can be generated for testing, training, and other purposes. Although a variety of implementations are envisioned, this description offers examples of the invention being performed using a Python programming language library with an outwards facing Application Programming Interface (API).

Figure 1:
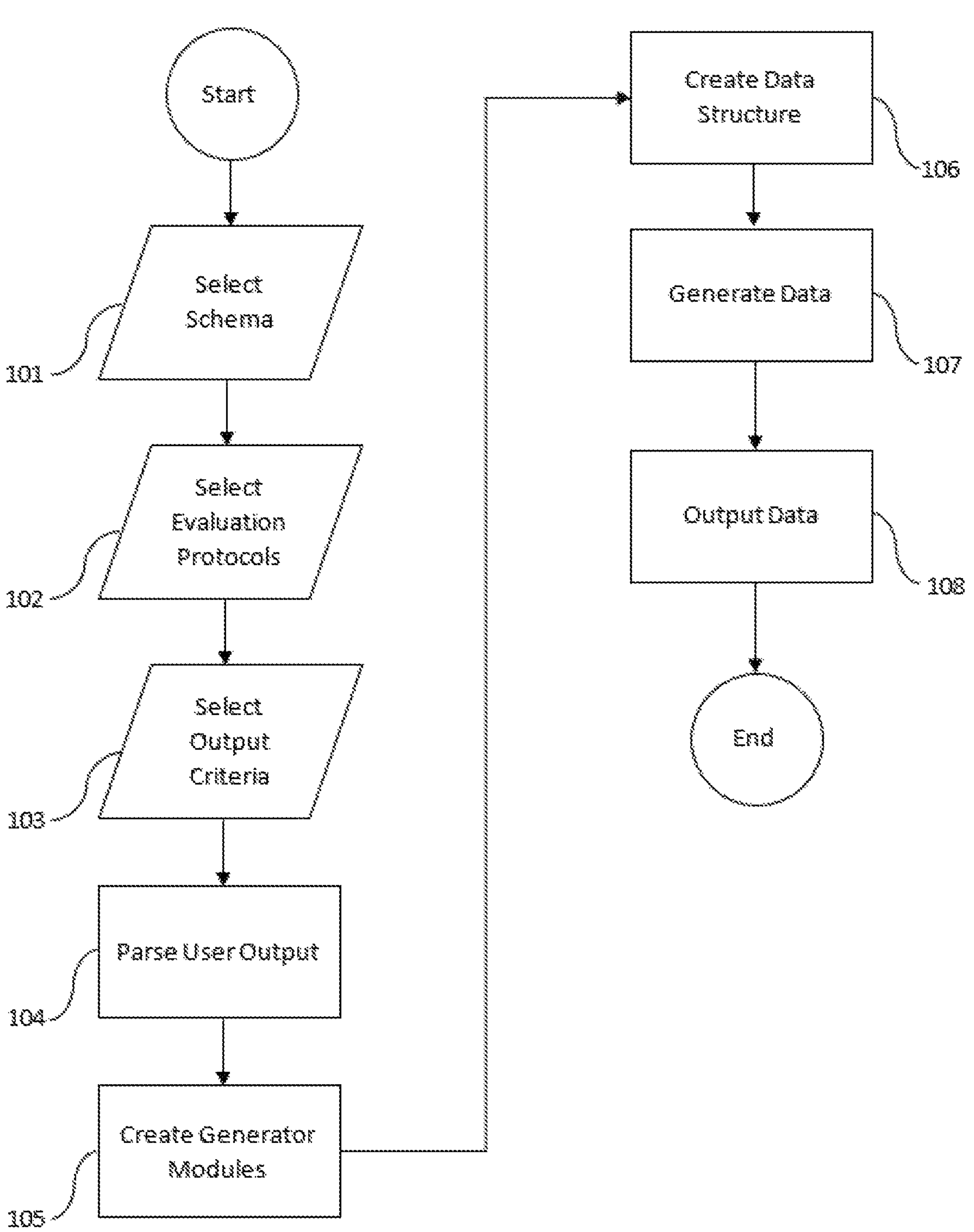
FIG. 1 is an exemplary flowchart showing a method of generating data using the selection of schema, evaluation protocols, and output criteria to create generator modules and output data structure, and then running the generator modules to create the desired outputs.

To be useful for its intended purpose, data generated using the invention must mimic the features and characteristics of other data. For example, data generated to test a geospatial data validation tool must contain articles of generated data that contain geospatial features that the validation tool can recognize and evaluate. As such, the foundational feature of the invention is generated data that contains articles of data relevant to a set of desired or required characteristics. Those data characteristics are established by a schema, with accompanying evaluation protocols that are written to institute the rules governing compliance with the schema. Referring to FIG. 1: using a selected schema 101 and evaluation protocols 102, and in view of user inputs 103 that have been parsed for accuracy and sufficiency 104, generator modules 105 can be created in accordance with the desired internal data structure. With the creation of the internal data structure 106, the generator modules can be executed 107 to create data at scale. The output data 108 can then be evaluated for compliance with the specified schema, and stored, viewed, and manipulated as desired.

As used herein, a schema is a specification or other means of standardizing data for purposes such as consistency, clarity, and interoperability. Schema can govern any or all of the aspects affecting data collection, storage, manipulation, interchange, and exploitation. Any schema is suitable for the purposes of this invention, including schemas for process modeling, rules management, data/metadata analysis and modeling, and information architecture. The selection of schema dictates the purpose, and also informs the quality and quantity, of the data to be generated. Whatever the schema, the present invention renders obsolete the need to find, or laboriously create, data to test or train tools that enable, reference, rely on, or otherwise relate to the schema.

For purposes of the invention, schema documentation is converted into a suitable programmatic form. Developing a schema processor module is one means for reading, interpreting, and converting the schema. When the invention is implemented using Python, schema documentation may be parsed and converted to XML or JSON. The schema processor module creates schema directories, dictionaries, and other objects necessary to be implemented into the Python API. Other implementations and formats will be readily apparent to one skilled in the art, and are encompassed in the invention. The same is true for other examples offered throughout.

For geospatial data, two examples of schemas are those for MGCP and TDS. MGCP's schema was developed to facilitate sharing of a wide range of geospatial data generated by a variety of nations, adopting standards to enable interoperability in a net-centric sharing environment. The U.S. National Geospatial-Intelligence Agency's TDS schema has similar aims, but focused on the collection and sharing of topographic data, a subset of geospatial data. If the use for generated data is to validate a quality assurance tool that will be used to check geospatial data for compliance with either schema, a Python API implementing the invention can produce data at any quantity for thorough and effective validation. Conceivably, the invention can generate data based on any schema, provided a correctly-formatted JSON or XML document representing the desired schema is substantiated within the Python API. Likewise, new versions of existing schema can be readily implemented by using the existing schema processor module to create new directory folders or other logical separation among schema versions.

Each schema necessarily includes a set of rules that apply to data used in connection with the schema. The schema rules establish at a granular level the conditions required of data to comply with the schema. For purposes of the invention, evaluation protocols that are derived from the schema establish sets of rules that the generated data must address. Because schema rules dictate logical relationships among data features, evaluation protocols are readily programmed using Python, or other suitable programming language, by parsing the written rules.

For a simple geospatial application, consider a schema that requires bridge features to have: 1) a coincident road; 2) the bridge has a transportation code of 'Road'; and 3) the road has a location code of 'Elevated.' To generate data that addresses this requirement, an evaluation protocol named 'BRGROAD' could be developed. Per EPSG 4326 terminology, an exemplary technical write-up of this evaluation protocol could consist of three conditions: 1) LAQ040 GEOMETRY=LAPO30 GEOMETRY; 2) LAQ040 TUC=13; and 3) LAPO30 LOC=44. As one skilled in the art will appreciate, these logical conditions can be readily converted to Python and other languages.

Of course, useful evaluation protocols need not, and often cannot, be so simple. As an example, tools designed to validate geospatial data under the MGCP schema need to evaluate aerodrome features in the data. The MGCP schema requires that an aerodrome stating a feature type of 'Major' must completely contain at least one runway having both a length of 910-12,000 feet and a surface type of 'hard/paved.' The schema requires that an aerodrome stating a feature type of 'Minor and Hard' must completely contain at least one runway having both a length of 10-910 feet and a surface type of 'hard/paved.' In similar fashion, an aerodrome stating a feature type of 'Minor and Soft' contains a runway having a length of 10-910 feet but no hard/paved runway surface. The remainder aerodrome feature types 'Unknown' and 'Other' must at least completely contain a runway.

Aerodrome features in the data that do not completely contain runways having the required feature types are erroneous under the schema. A robust validation tool needs to possess the algorithmic breadth to interpret aerodromes having feature types that both pass and fail the schema requirements. Accordingly, test data for the validation tool should introduce every possible combination of variables, including complex or unusual corner cases that may never actually occur in datasets requiring validation. The more the validation tool correctly interprets the test data, the more confidence can be placed in the tool. As with BRGROAD, an 'AERODROME' evaluation protocol is readily reducible to a technical format and programmed in Python or other desired language.

Once the user selects a schema and further selects all or a subset of the schema's available evaluation protocols, the method calls for the user to input further criteria concerning the data to be generated. For example, the user selects the number of data sets desired, the scope of the data sets, and an output directory. The user input is then parsed for sufficiency, and to prepare for data generation. Erroneous entries can be returned to the user until valid parameters for data generation have been entered.

Generator modules are created from selected evaluation protocols, using Python or other suitable programming language. New directories are created, as well as other files needed to generate data consistent with the evaluation protocols, desired output formats, and so forth. The internal data structure employed to organize and store the generated data can be as simple or complex as the schema and evaluation protocols require. Once the internal data structure has been created, the generator modules are run, generating and collecting data according to the internal data structure. The generated data can then be output into a variety of formats selected by the user. Output writers such as Shapely and Fiona are suitable for the output step, though other modules having similar function are readily apparent to one skilled in the art, and within the scope of the invention.

One embodiment of the invention uses an internal data structure composed of one or more bounding boxes that are each designated to store different articles of generated data at different locations. A bounding box establishes the boundaries of the data to be collected therein. Bounding boxes may be established according to topics, keywords, subject matter, language, organizational element, business unit, timeline, geography, and any other data/metadata characteristic relevant to the selected schema. Each bounding box may be accompanied by metadata describing the data it contains.

Another embodiment of the invention employs an internal data structure where multiple bounding boxes are arranged into a multilevel nested hierarchy, or 'hierarchy' for short. At the top level is always a bounding box that contains the entirety of generated data; the fundamental principle of the hierarchy is that any bounding box can wholly contain one or more other bounding boxes of lesser scope. Accordingly, subordinate bounding boxes can further contain one or more bounding boxes, extending to as many levels as is necessary to generate the variety and volume of data desired. By way of simple example, a bounding box labeled 'Literary Works' could contain bounding boxes labeled 'Fiction' and 'Nonfiction.' 'Fiction' could further contain boxes for 'Fantasy,' 'Historical Fiction,' etc.—likewise for various categories of nonfiction under 'Nonfiction'—on down to whatever levels of subcategories best approximates data that (once generated) would be relevant to the selected schema as interpreted by the selected evaluation protocols.

At its simplest form, the hierarchy resembles one linear set of bounding boxes akin to a set of ever-smaller matryoshka (aka "Russian") dolls. But whereas each and every bounding box can function as a container for smaller bounding boxes, a realistic graphical representation of the internal data structure would more resemble a multigenerational family tree, or a corporate organizational chart, where some components have an extensive chain of sub- and sub-sub-components (and so forth), but other components have few or none.

The expandable and adaptable complexity of the hierarchy of bounding boxes is conceptually unlimited, though confined by practicalities such as a finite set of schema rules, available processing power, storage space, and so forth. In the context of geospatial data, the invention can utilize a hierarchy of bounding boxes to ensure the integrity of spatial interactions of the generated data. In such a case, each bounding box is defined by a set of two geocoordinates describing opposite vertices of a rectangle. Although lower-left and upper-right geocoordinates are traditional and preferred for defining the bounding box, the embodiment could be practiced using the geocoordinates of the other two vertices of the rectangle to describe each bounding box.

In order to minimize problems involving assignment of geocoordinates to the generated data, the geometry of the generated data can be based on geocoordinates relative to the bounding box into which they are generated. Instead of using absolute geocoordinates, generator modules would refer to the center or edges of the relevant bounding box. Using this strategy of relative geometry allows the programmer to create bounding boxes of virtually any size, although evaluation protocols may dictate limits on the size of one or more bounding boxes, depending on the schema rule being implemented.

Figure 2:
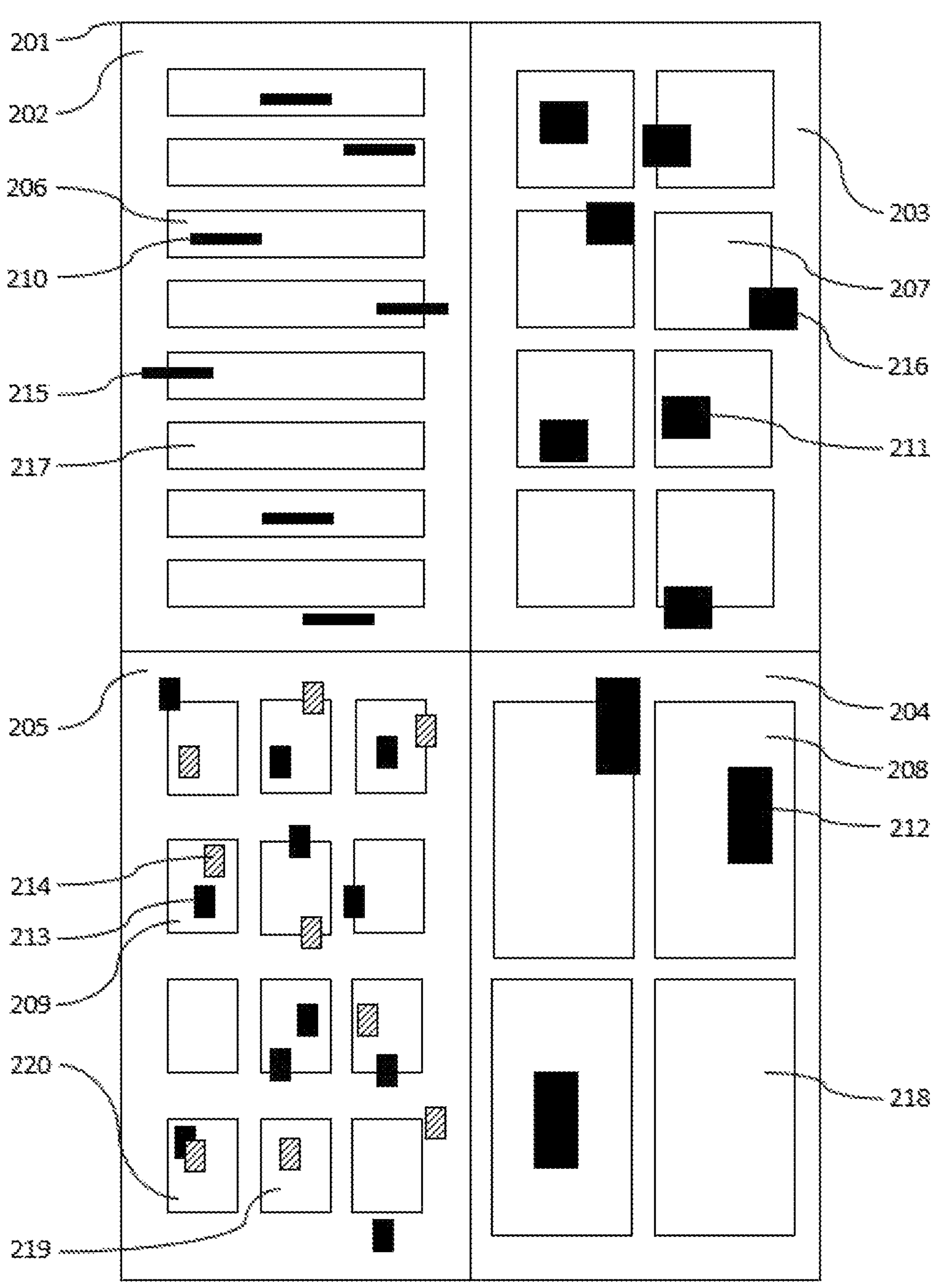
FIG. 2 is an exemplary graphical display, contrived to appear similar to generated geospatial data as it would be displayed using GIS software. Each large quadrant represents a different evaluation condition for which data is generated. Within each quadrant are multiple data articles, each a set of large and small rectangles. Every instance where a shaded rectangle falls wholly within the larger rectangle represents data that would pass the condition. Instances where a shaded rectangle falls all or partly outside the larger rectangle represents data that would fail the condition. Not all possible combinations of generated data are represented.

To give the reader an appreciation of the scalable complexity available through a hierarchy of bounding boxes, FIG. 2 shows a simplified exemplary graphical representation of generated geospatial data. The top-level bounding box 201 contains four quadrants 202, 203, 204, and 205, equally sized for simplicity's sake. Each quadrant is itself a bounding box built to evaluate a separate evaluation protocol. Within each quadrant are multiple articles of data, each a set of a larger unshaded rectangle—exemplified by items 206, 207, 208, and 209—and a smaller shaded rectangle(s), exemplified by items 210, 211, 212, 213, and 214. For illustrative purposes, the different shading patterns exemplified in items 213 and 214 demonstrates that quadrant 205 simultaneously tests two features, reinforcing that the invention exhibits flexibility to generate data that reflects the complexity of the selected schema and the selected evaluation protocols.

For each set, a shaded rectangle that is wholly within the unshaded rectangle represents an article of data that fulfills the condition evaluated. Rectangles 210, 211, 212, and the 213/214 pair are examples of such articles of data. (Not all articles fulfilling the condition are labeled to avoid cluttering the figure.) In contrast, shaded rectangles that fall partly or wholly outside the unshaded rectangle represent articles of data that fail to fulfill the condition evaluated. Rectangles 215 and 216 represent such articles of data (though again not all articles failing a condition are labeled as such or referenced here). In like manner, rectangles 217, 218, and 219 are examples of articles of data that would fail to comply with the evaluated condition because at least one smaller shaded rectangle, i.e. a required feature according to the evaluation protocol, is missing.

As further illustration of the flexibility provided by the invention, Rectangle 220 shows an article of data having overlapping features. Whether or not this article of data would fulfill the condition evaluated depends on whether the specific evaluation protocol forbids or allows overlap of the two features. If overlap is forbidden by the selected evaluation protocol, 220 would represent a fail; if allowed, a pass.

FIG. 2 is an easily-visualized example of how bounding boxes can be structured to generate data possessing the volume and variety desired for testing and training data. The imagined geospatial setting is chosen because the concept of bounding boxes built to test evaluation protocols is easily grasped in a context governed by physical objects described by geocoordinates. For example, the bounding box that is quadrant 202 could graphically represent data generated to test whether a data validation tool can accurately identify errors with respect to whether an aerodrome feature contains a runway. The bounding box that is quadrant 203 could graphically represent data generated to test whether an application can identify when a specified area contains a specific type or size of building. Several real-world cases can be readily imagined for each quadrant, but it bears emphasizing that the concept of bounding boxes need not be limited to the geospatial or any real-world environment. Even schemas involving abstract concepts-such as the above notion of dividing written works into fiction and nonfiction—are within the scope of the invention, i.e. whenever superior/subordinate logical relationships can be defined among data characteristics to establish a hierarchy of bounding boxes.

In another embodiment employing the strategy of a hierarchy of bounding boxes, the generator modules are configured to generate data beginning at the lowest level of the hierarchy, and then to compile data at successively higher levels. Through this feature, bounding boxes pass their respective data up the chain to their parent element, where it is combined with data from sibling bounding boxes without losing the underlying structure. The combination of data at any level can be isolated and exploited for numerous purposes such as comparison, successive or iterative evaluation of conditions per the relevant evaluation protocol, and so forth. Furthermore, the hierarchical data relationship can be engineered to hold true regardless of how many levels of superior/subordinate relations exist within any bounding box.

In another embodiment, the user may select whether generated data will include data that fulfill one or more conditions established by the one or more selected evaluation protocols, data that fail to full the one or more conditions, or both types. In the aerodrome example offered above, generating a mix of data is essential to robustly testing any tool to be used for validating geospatial data. Given variables such as runway length, runway placement relative to the aerodrome feature, and runway surface type, the validation tool must address a sizable number of different scenarios. Generating a range of test data that merely violates the rules of the selected schema requires on the order of 58 cases; however, generating test data that complies with the rules would require on the order of an additional 1,244 cases. While it would be tempting to conserve resources by focusing on the noncompliant cases, a full range of data is necessary to fully test validation tools: false positives are no more desirable than uncaught errors. Fortunately, the advantages of the present invention alleviate the need to limit the production of generated data to any subset of cases.

As a shorthand, this dichotomy of data can termed 'good' data and 'bad' data, at least in the context of data generated to test a validation tool because a core function of a validation tool is to identify and reject data that is noncompliant with a selected schema. Admittedly, the good/bad shorthand is inapt for some desired end-uses of generated data, but will be used in the following discussion for illustrative simplicity.

If the user selects both good data and bad data to be generated, the internal data structure would employ a hierarchy of bounding boxes that provides for separate bounding boxes to contain good data and bad data under each bounding box required to evaluate a condition under the evaluation protocol. As with bounding boxes generally, these bounding boxes may be accompanied by metadata that indicates the contents, namely good data or bad data, for ease of search and reference.

Consider an example where an evaluation protocol establishes a condition where values 'a,' 'b,' and 'c' are attributes of an article of data that is schema compliant, and 'd' is an attribute of an article of data that is noncompliant. If the user selects that both good and bad data will be generated, the relevant portion of the internal data structure would include: 1) an overall bounding box for the condition; 2) within the overall bounding box, two separate subordinate bounding boxes, one each for good data and bad data; and 3) within the bounding box for good data, three subordinate bounding boxes, one each for a, b, and c. If the user requests one set of data, running the generator modules would produce four data articles, one for each value a to d, i.e. three articles of good data and one article of bad data. Requesting two sets would generate six articles of good data and two bad, and so forth, up to the scale of data desired by the user.

Figure 3:
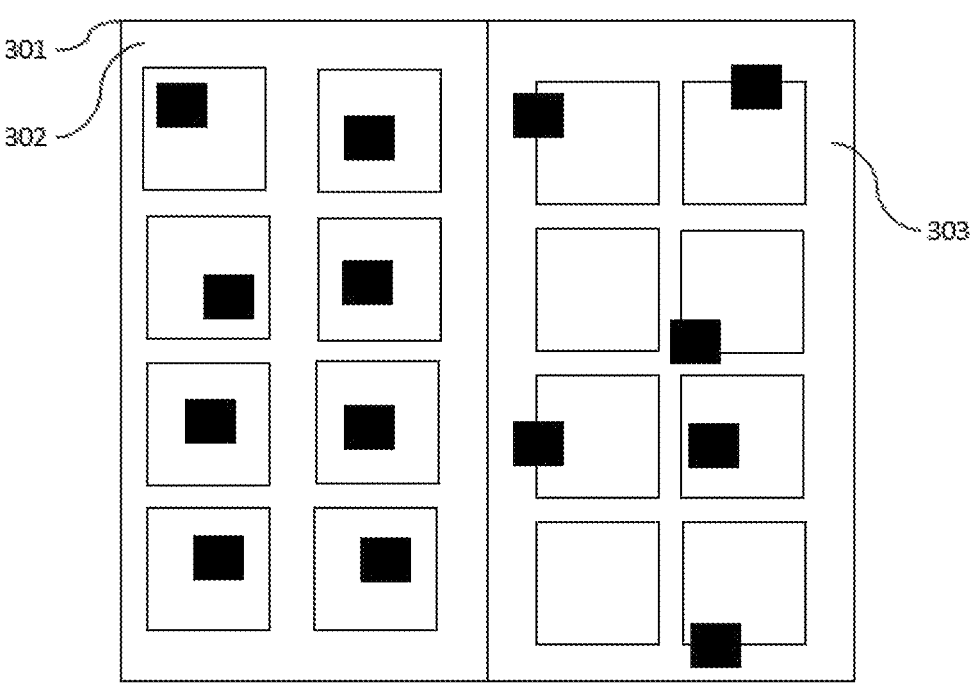
FIG. 3 is an exemplary graphical display, contrived to appear similar to generated geospatial data as it would be displayed using GIS software. The representation is divided into two halves, one side containing only articles of generated data that fulfill a condition established by a selected evaluation protocol. The other side contains only articles of generated data that fail to fulfill the condition.

FIG. 3 uses a geospatial example to illustrate the concept of separate bounding boxes for good data and bad data. Rectangle 301 represents the overall bounding box for the condition to be evaluated, further divided into two subordinate bounding boxes. The size of the subordinate bounding boxes need not be equal, but are the same size for ease of illustration. Returning to the principles used to describe the articles of data shown in FIG. 2, rectangle 302 represents the bounding box that contains good data. Each article of data shows a smaller shaded rectangle that is wholly contained within the larger unshaded rectangle, thereby fulfilling the condition established by the selected evaluation protocol. Rectangle 303 represents the bounding box that contains bad data. Each article of data shows a smaller shaded rectangle that is either missing or not wholly contained with the larger unshaded rectangle, thereby failing to fulfill the condition established by the evaluation protocol.

Figure 4:
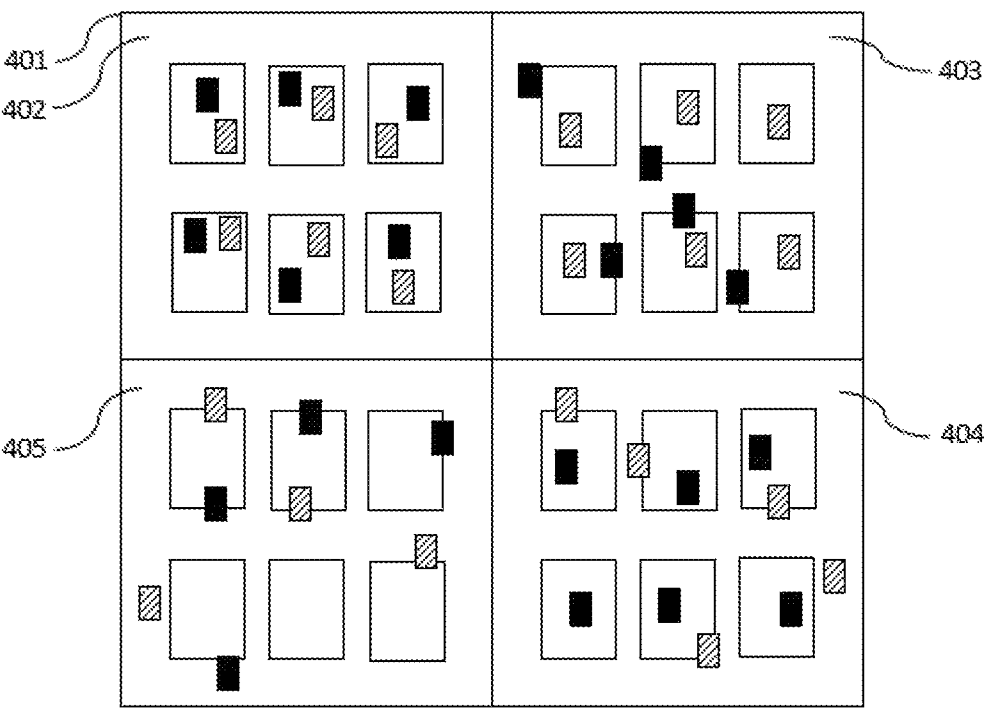
FIG. 4 is an exemplary graphical display, contrived to appear similar to generated geospatial data as it would be displayed using GIS software. The representation is divided into four quadrants, with one quadrant containing only articles of generated data that fulfill a condition established by a selected evaluation protocol. The other three quadrants each contain only articles of generated data that fail to fulfill a condition established by a selected evaluation protocol, divided by quadrant according to type of failure.

FIG. 4 shows additional strategies for generating data according to how the data fulfills, or fails to fulfill, a condition established by the selected evaluation protocol. Rectangle 401 represents the overall bounding box for the condition to be evaluated, further divided into four subordinate bounding boxes. The size of the subordinate bounding boxes need not be equal, but each are the same size for ease of illustration. Relying again on the principles used to describe the articles of data shown in FIG. 2, rectangle 402 represents the one subordinate bounding box that contains good data. Each article shows both smaller shaded rectangles that are wholly contained within the larger unshaded rectangle, thereby fulfilling the condition established by the selected evaluation protocol. Rectangle 403 represents a bounding box that contains bad data, but only those articles of data where the placement or absence of the smaller black-shaded rectangle accounts for the failure to fulfill the condition. Likewise, rectangle 404 represents a bounding box that contains bad data, but only those articles of data where the placement or absence of the smaller stripe-shaded rectangle accounts for the failure to fulfill the condition. Finally, rectangle 405 represents a bounding box that contains bad data, but only those articles of data where both smaller shaded rectangles fail to fulfill the condition, whether by their placement or absence.

As with FIG. 2, FIG. 3 and FIG. 4 illustrate straightforward examples that suggest the versatility of bounding boxes, especially within a hierarchy. Depending on selected schema, selected evaluation protocols, and user inputs, bounding boxes for good data, bad data, or both can be subdivided into discrete bounding boxes to better describe, understand, and control the output and use of the generated data. The exemplary representations further exhibit how generator modules and internal data structures can be configured to generate data having a wide array of complexity and specificity. The embodiment allows users to obtain generated data having articles that display a specified mix of qualities at a granular level suitable for a variety of schema-related applications.

In a further embodiment of the invention, generator modules can be configured to generate data that is grouped together by feature class. Such configurations can make use of a hierarchy of bounding boxes, parsing article or feature metadata, or other means amenable to the selected schema and the programming environment used to implement the invented method.

In another embodiment of the invention, the output generated data is used to test a data validation tool that is designed to check data for compliance with a selected schema. In the geospatial context, it is desirable to check data attributes and geometric characteristics, as well as relative spatial relations to adjacent data. Data used to test tools for the validation of geospatial data would need to be generated at-scale and having the desired geometry and attribution. Through the invention, test articles of geospatial data can be prescribed for every possible eventuality of any algorithm, and also for known good and bad data.

As suggested in the background section, the invention can be applied beyond generating data to test data validation tools. A range of government, military, academic, and commercial uses exist, or can be created and developed in connection with the invention, many centered on the growing field of machine learning. In the use of military operations, modeling human geography is of a particular challenge especially when in the context of countering an adversarial force. Where the adversary employs insurgency tactics and other nontraditional means of warfare, there exists an operational need to dismantle the logistical infrastructure of an insurgent organization in order to segregate it from the population. An area of operations may include a dozen population centers; the insurgency may operate in any or all, hiding caches of weapons and equipment, or other targets of value.

The military officers leading a counterinsurgency campaign would benefit from having a model of probable cache locations, informed based on numerous variables such as proximity to roads, particular buildings, and so forth. With this invention, evaluation protocols could be derived from the model's schema. The mathematical model would be developed using a Machine Learning (ML) algorithm requiring a large set of training data possessing biased statistical factors such as proximity to geographic and other features. The real-world feature data extracted from the operational environment would in most cases not be of sufficient quantity to serve as training data for a ML model. An operational need for large amounts of geospatial data then arises to develop the training data needed to generate the model.

The invention could be leveraged to create n-number of simulated vectorized population centers and the numerous features therein, the respective terrain, and cache locations—each similar in structure but different in other details, remaining true to real-world examples. Generated data would provide one or more simulations to be used as training data required to train the model. Verifying the generated geospatial data against real-world examples would be paramount to ensure the desired variable correlation is maintained. As the model improves based on real-world information, generator modules and internal data structures can be adjusted to generate new data in a continuous effort to iteratively improve the model. By accelerating automation efforts, efforts could be focused on analyzing atypical elements of the operational environment.

As the reader will appreciate, the weapons cache example is arbitrary, in that the same strategy can be applied to use the invention in support of any number of defense and intelligence needs that would benefit from a guiding model. Just as easily, models improved by the invention can be employed to identify locations of enemy units, locations of equipment identified in the order of battle, attacking or defending an air-defense or ground-defense network, sustainment of logistics chains, identifying or locating command-and-control nodes, and so on.

For nonmilitary uses, the invention could also be used to train models for various purposes. Public health officials could develop models for mapping and understanding spreading and containment of diseases. Especially valuable would be efforts to identify underserved demographics, for example pockets of the population that lack access to essential services such as police, fire departments, or nearby medical facilities. Academic researchers could develop models to improve understanding of biological, chemical, and environmental processes, historical and sociological trends, and so forth.

For commercial applications, the usefulness of generating large amounts of geospatial data to train ML models is readily apparent for applications that focus on real-estate development, optimizing locations of retail outlets, placement of cell towers and other communication nodes, etc. Pharmaceutical companies could improve models for discovering, selecting, and testing compounds for therapeutic use. Other commercial applications include models for understanding and forecasting trends in financial markets, real estate, energy, and other sectors.

Geospatial-related commercial applications abound, too. Using commercial real estate as another example, a real-estate developer might be faced with the challenge of determining the optimum location of a new storage rental facility. A useful model for decision-making would need to consider several variables extracted from the real-world environment, such as drive time to smaller residences that might determine the demand for offsite storage, such as apartment complexes, retirement communities, and "starter" homes. The quantity of real-world vectorized data to train the model might be lacking. If so, the invention would provide a means to generate data to test and train the ML model until it becomes a tool for successful decision making. One could make use of the invented method to generate a large quantity of geospatial training data to assist with the creation of the desired ML model that will identify probable geographic locations where a new storage facility would be commercially viable. As will be readily discerned, the storage facility example could as easily be any commercial building or operation, such as a restaurant, grocery store, bank, and so forth.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments and/or combine any number of the disclosed embodiments without departing from the spirit or scope of this specification.

What is claimed is:

1. A method of training a model using mimicking training data, the method comprising:

receiving, at a model, mimicking training data generated by a process comprising:

selecting, by a user, a schema having desired or required characteristics, related to geospatial features, for the mimicking training data to comply with the schema;

selecting, by the user, one or more evaluation protocols associated with the selected schema;

creating generator modules for the evaluation protocols;

creating an internal data structure to compile and record mimicking generated training data, the mimicking generated training data being generated from the generator modules after the schema is selected, the internal data structure comprising a plurality of bounding boxes wherein at least a first bounding box is arranged to only contain mimicking generated training data that comply with the schema and at least a second bounding box is arranged to only contain mimicking generated training data that do not comply with the schema;

executing the generator modules to create the mimicking generated training data according to the internal data structure, wherein the mimicking generated training data comprises geospatial features including map features; and training the model using, at least in part, the mimicking generated training data where the training comprises evaluating whether the model can accurately identify errors in a validation tool.

2. The method of claim 1, wherein the plurality of bounding boxes are arranged logically in a hierarchy.

3. The method of claim 1, wherein the at least second bounding box contains a plurality of subordinate bounding boxes that each contain only mimicking generated training data that are non-compliant with at least one specified protocol of the selected schema.

4. The method of claim 1, wherein the one or more selected evaluation protocols dictates the size of the plurality of the bounding boxes.

5. The method of claim 1, wherein the one or more protocols forbids overlap of two or more features.

6. The method of claim 1, wherein the boundaries of at least two of the plurality of bounding boxes are defined by geocoordinates, and wherein a logical relationship between the at least two bounding boxes is established according to geocoordinates relative to the two bounding boxes.

7. The method of claim 1, wherein at least a third bounding box is generated according to metadata characteristics related to the schema.

8. The method of claim 1, wherein the mimicking generated training data comprises vectorized geospatial data and the schema evaluates geospatial features in the mimicking generated training data.

9. A method of improving the accuracy of a model using mimicking training data, the method comprising:

receiving, at a trained model, mimicking training data generated by a process comprising:

selecting, by a user, a schema having desired or required characteristics, related to geospatial features, for the mimicking training data to comply with the schema;

selecting, by the user, one or more evaluation protocols associated with the selected schema;

creating generator modules for the evaluation protocols;

creating an internal data structure to compile and record mimicking generated training data, the mimicking generated training data being generated from the generator modules after the schema is selected, the internal data structure comprising a plurality of bounding boxes wherein at least a first bounding box is arranged to only contain generated data that comply with the schema and at least a second bounding box is arranged to only contain generated data that do not comply with the schema;

executing the generator modules to create the mimicking generated data according to the internal data structure, wherein the mimicking generated training data comprises geospatial features including map features; and improving the accuracy of the model by further iteratively training the model using, at least in part, mimicking generated training data newly generated based on real-world data.

10. The method of claim 9, wherein the plurality of bounding boxes are arranged logically in a hierarchy.

11. The method of claim 9, wherein the at least second bounding box contains a plurality of subordinate bounding boxes that each contain only mimicking generated training data that are non-compliant with at least one specified protocol of the selected schema.

12. The method of claim 9, wherein the one or more evaluation protocols dictates the size of the plurality of bounding boxes.

13. The method of claim 9, wherein the one or more protocols forbids overlap of two or more features.

14. The method of claim 9, wherein the boundaries of at least two of the plurality of bounding boxes are defined by geocoordinates, and wherein a logical relationship between the at least two bounding boxes is established according to geocoordinates relative to the two bounding boxes.

15. The method of claim 9, wherein at least a third bounding box is generated according to metadata characteristics related to the schema.

16. The method of claim 9, wherein the mimicking generated training data comprises vectorized geospatial data and the schema evaluates geospatial features in the mimicking generated data.

17. A method of creating mimicking training data, the method comprising:

selecting, a schema having desired or required characteristics, related to geospatial features, for the mimicking training data to comply with the schema;

selecting, one or more evaluation protocols associated with the selected schema;

creating generator modules for the evaluation protocols;

creating an internal data structure to compile and record mimicking generated training data, the mimicking generated training data being generated from the generator modules after the schema is selected, the internal data structure comprising a plurality of bounding boxes wherein at least a first bounding box is arranged to only contain mimicking generated training data that comply with the schema and at least a second bounding box is arranged to only contain mimicking generated training data that do not comply with the schema;

executing the generator modules to create the mimicking generated training data according to the internal data structure, wherein the mimicking generated training data comprises geospatial features including map features; and training the model using one or more simulations, provided by the mimicking generated training data, as training data.

18. The method of claim 17, wherein the plurality of bounding boxes are arranged logically in a hierarchy.

19. The method of claim 17, wherein the at least second bounding box contains a plurality of subordinate bounding boxes that each contain only mimicking generated training data that are non-compliant with at least one specified protocol of the selected schema.

20. The method of claim 17, wherein the one or more selected evaluation protocols dictates the size of the plurality of bounding boxes.

21. The method of claim 17, wherein the one or more protocols forbids overlap of two or more features.

22. The method of claim 17, wherein at least a third bounding box is generated according to metadata characteristics related to the schema.

23. The method of claim 17, wherein the mimicking generated training data comprises vectorized geospatial data and the schema evaluates geospatial features in the mimicking generated training data.

* * * * *